No. 766,162. PATENTED AUG. 2, 1904.
J. A. BOOTH.
CAN SOLDERING MACHINE.
APPLICATION FILED MAY 24, 1900. RENEWED JAN. 7, 1904.
NO MODEL. 6 SHEETS—SHEET 1.
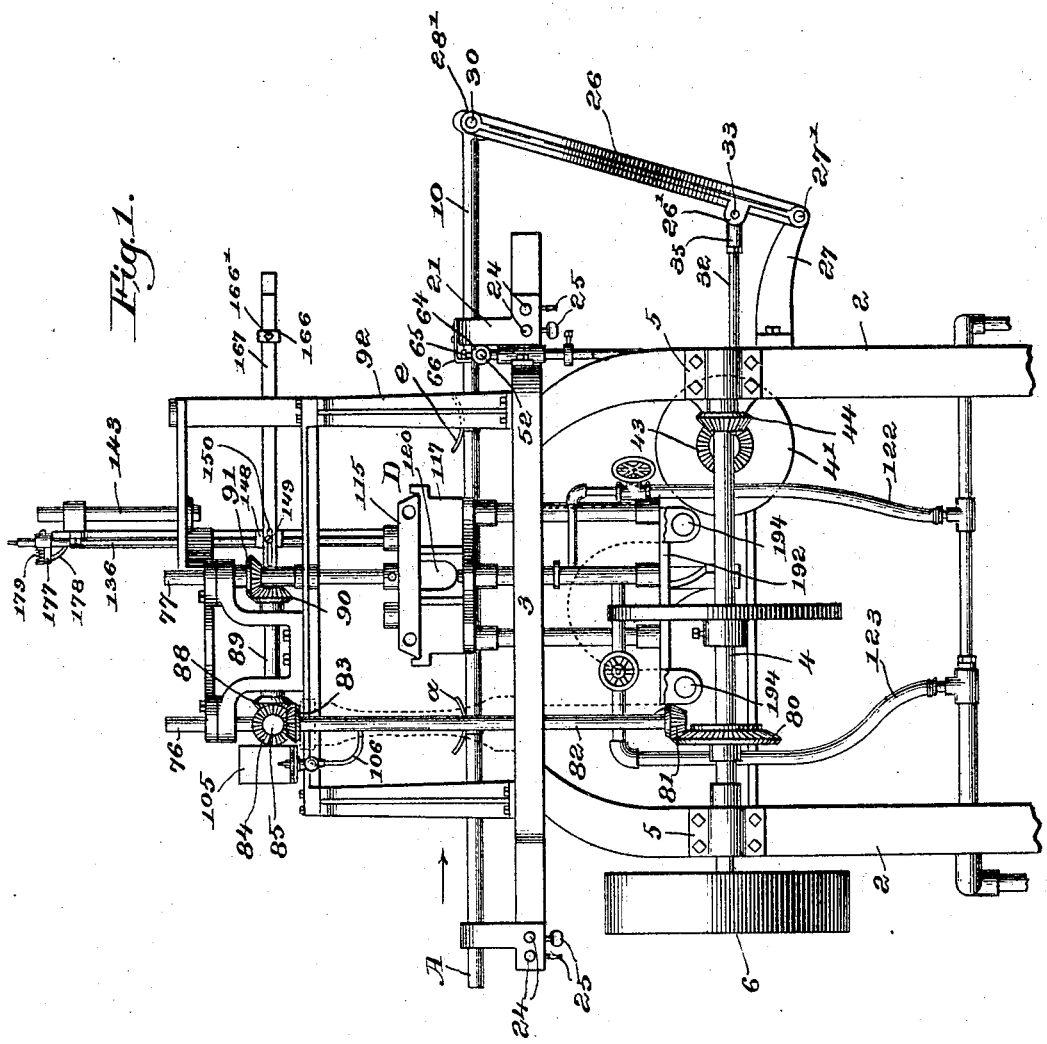
Witnesses.
Thomas J. Drummond.
Edward F. Allen.
Inventor.
James A. Booth,
by Crosby & Gregory
attys.

No. 766,162. PATENTED AUG. 2, 1904.
J. A. BOOTH.
CAN SOLDERING MACHINE.
APPLICATION FILED MAY 24, 1900. RENEWED JAN. 7, 1904.
NO MODEL. 6 SHEETS—SHEET 2.
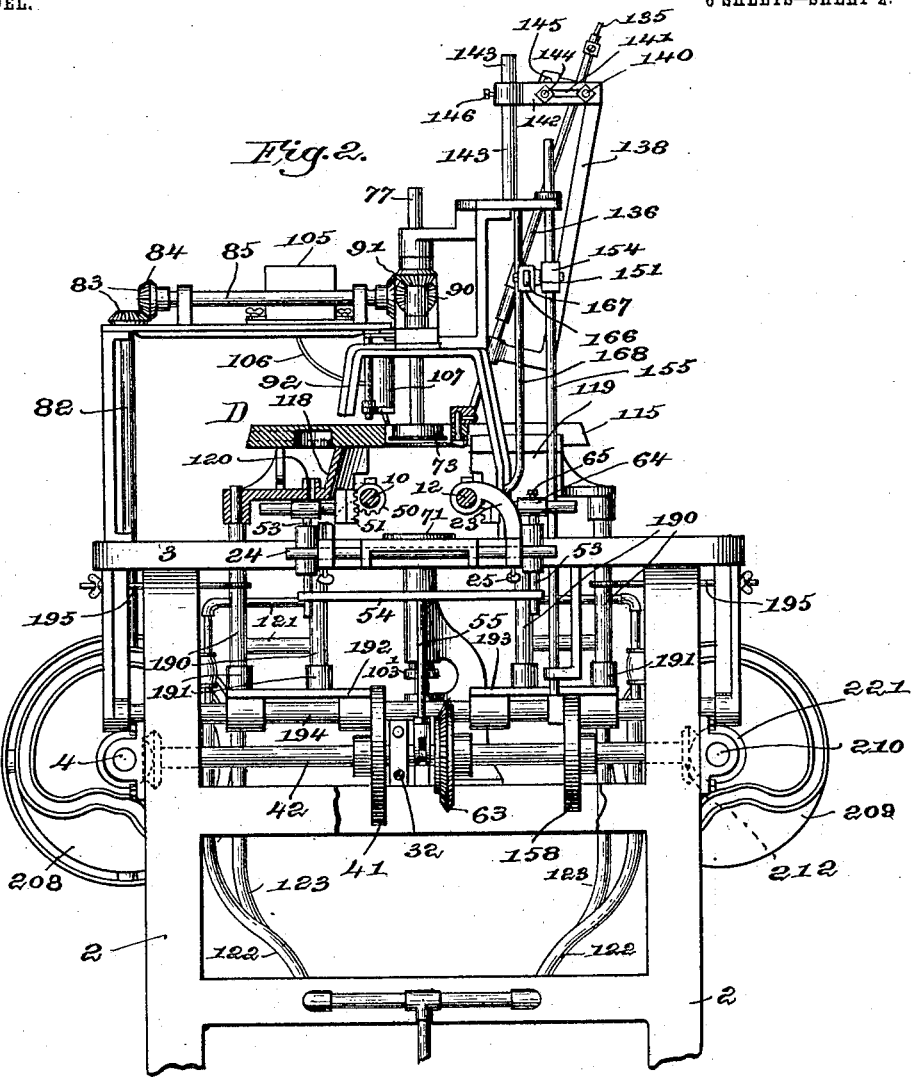
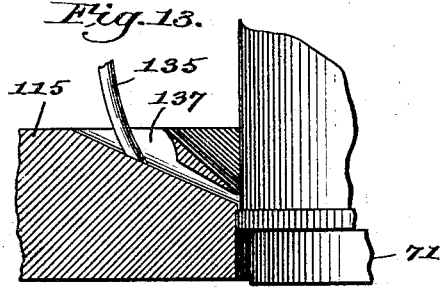
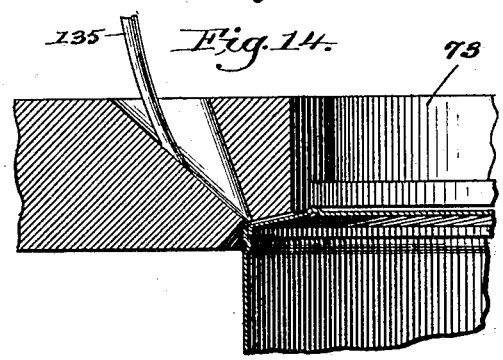
Witnesses.
Thomas J. Drummond.
Edward F. Allen.
Inventor.
James A. Booth,
by Crosby & Gregory
Attys.

No. 766,162. PATENTED AUG. 2, 1904.
J. A. BOOTH.
CAN SOLDERING MACHINE.
APPLICATION FILED MAY 24, 1900. RENEWED JAN. 7, 1904.
NO MODEL. 6 SHEETS—SHEET 3.
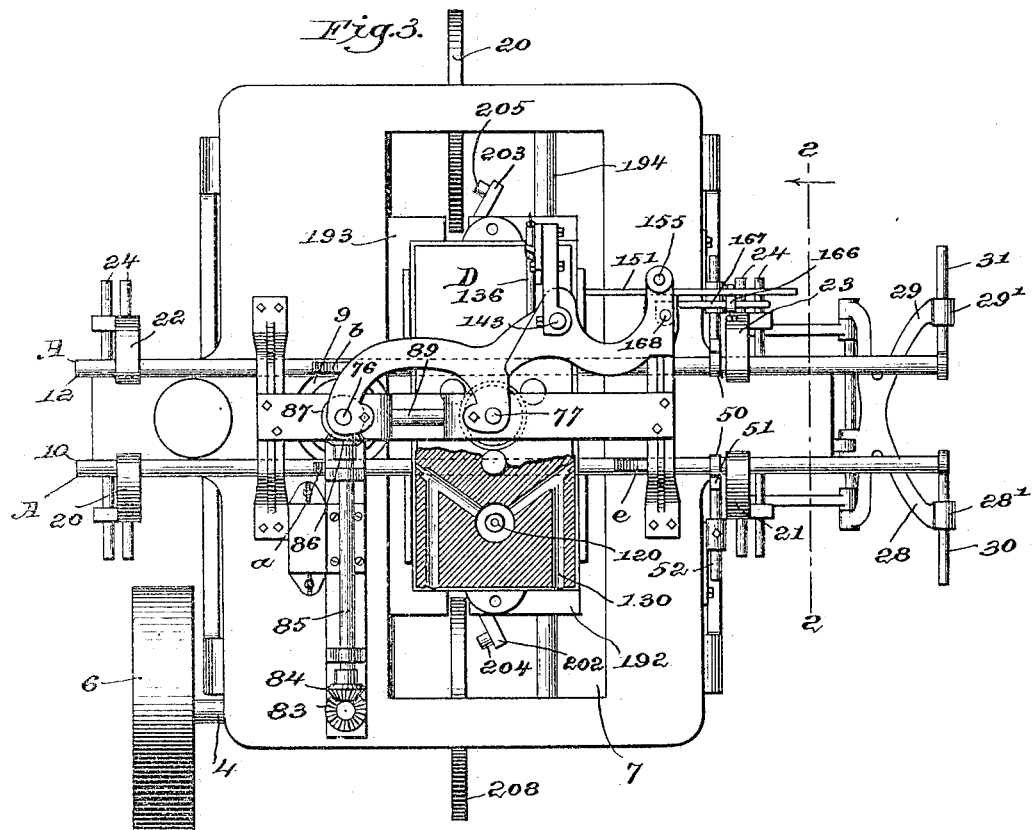
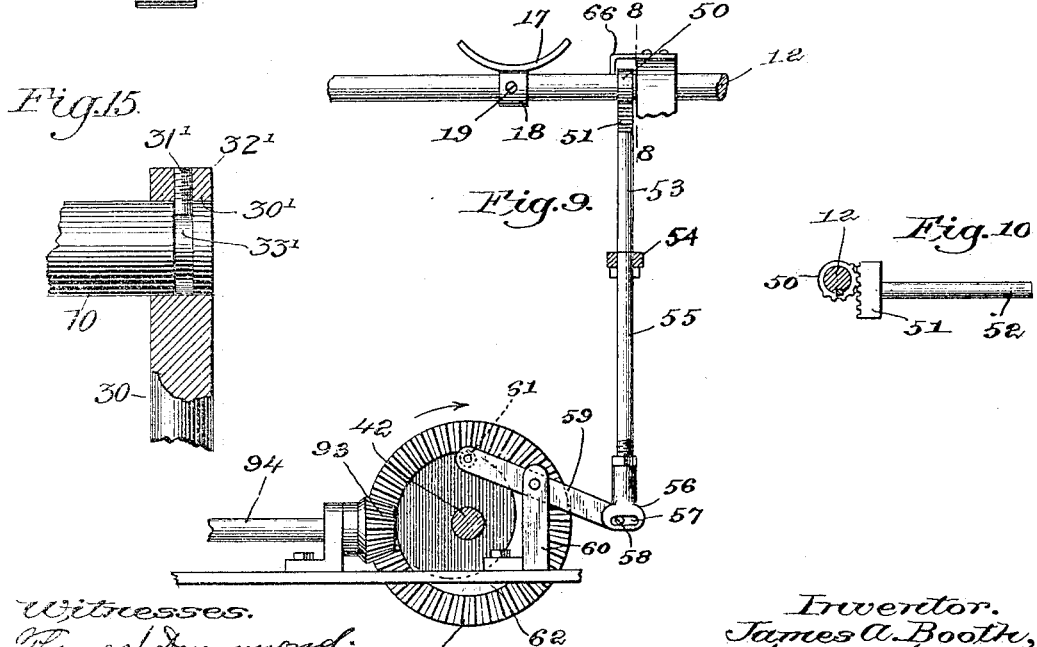
Witnesses.
Thomas J. Drummond.
Edward H. Allen.
Inventor.
James A. Booth,
by Crosby & Gregory
Attys.

No. 766,162. PATENTED AUG. 2, 1904.
J. A. BOOTH.
CAN SOLDERING MACHINE.
APPLICATION FILED MAY 24, 1900. RENEWED JAN. 7, 1904.
NO MODEL. 6 SHEETS—SHEET 4.

Witnesses.
Thomas J. Drummond
Edward F. Allen.

Inventor.
James A. Booth,
by Lewsby & Gregory
Attys.

No. 766,162. PATENTED AUG. 2, 1904.
J. A. BOOTH.
CAN SOLDERING MACHINE.
APPLICATION FILED MAY 24, 1900. RENEWED JAN. 7, 1904.
NO MODEL. 6 SHEETS—SHEET 5.
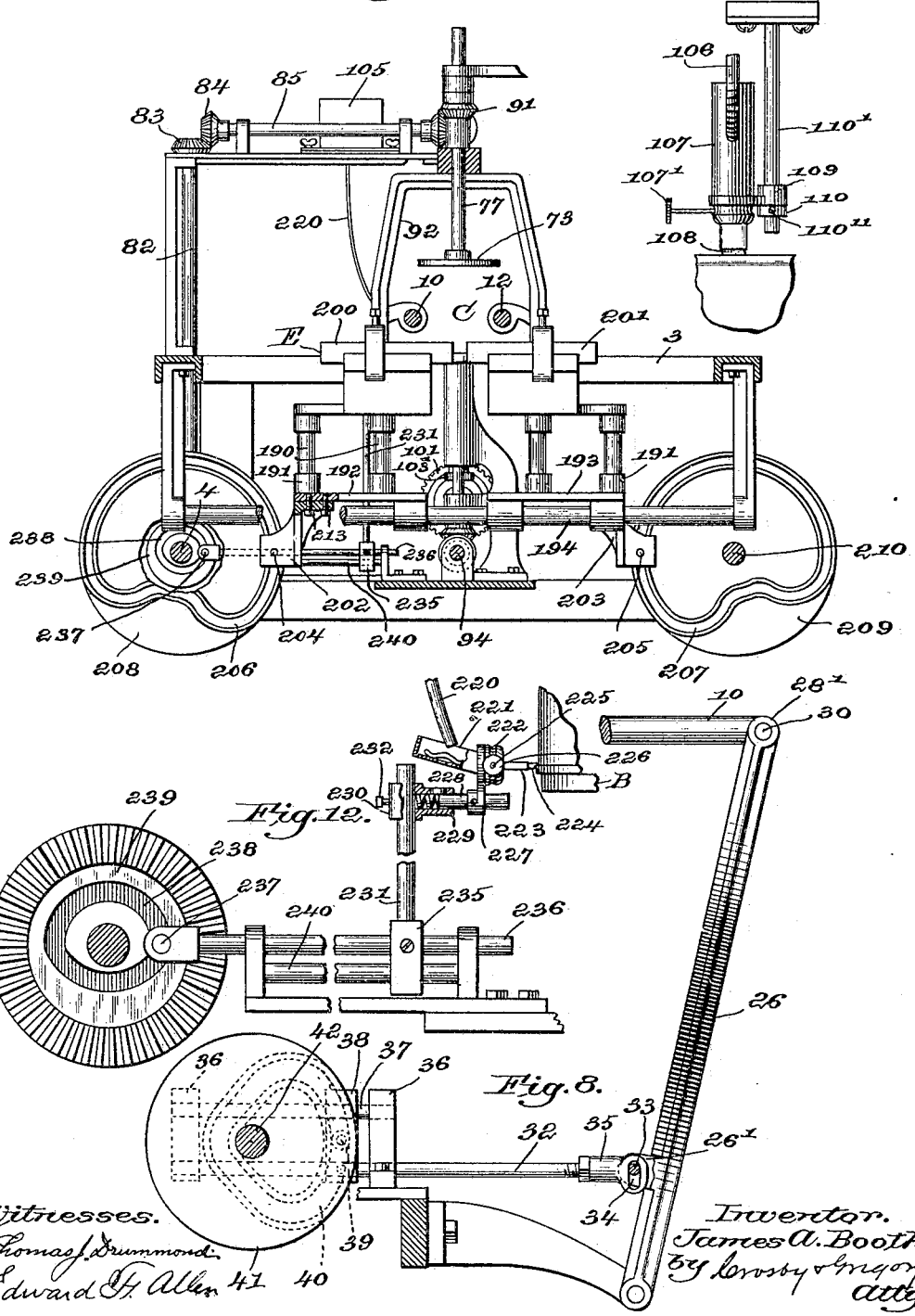

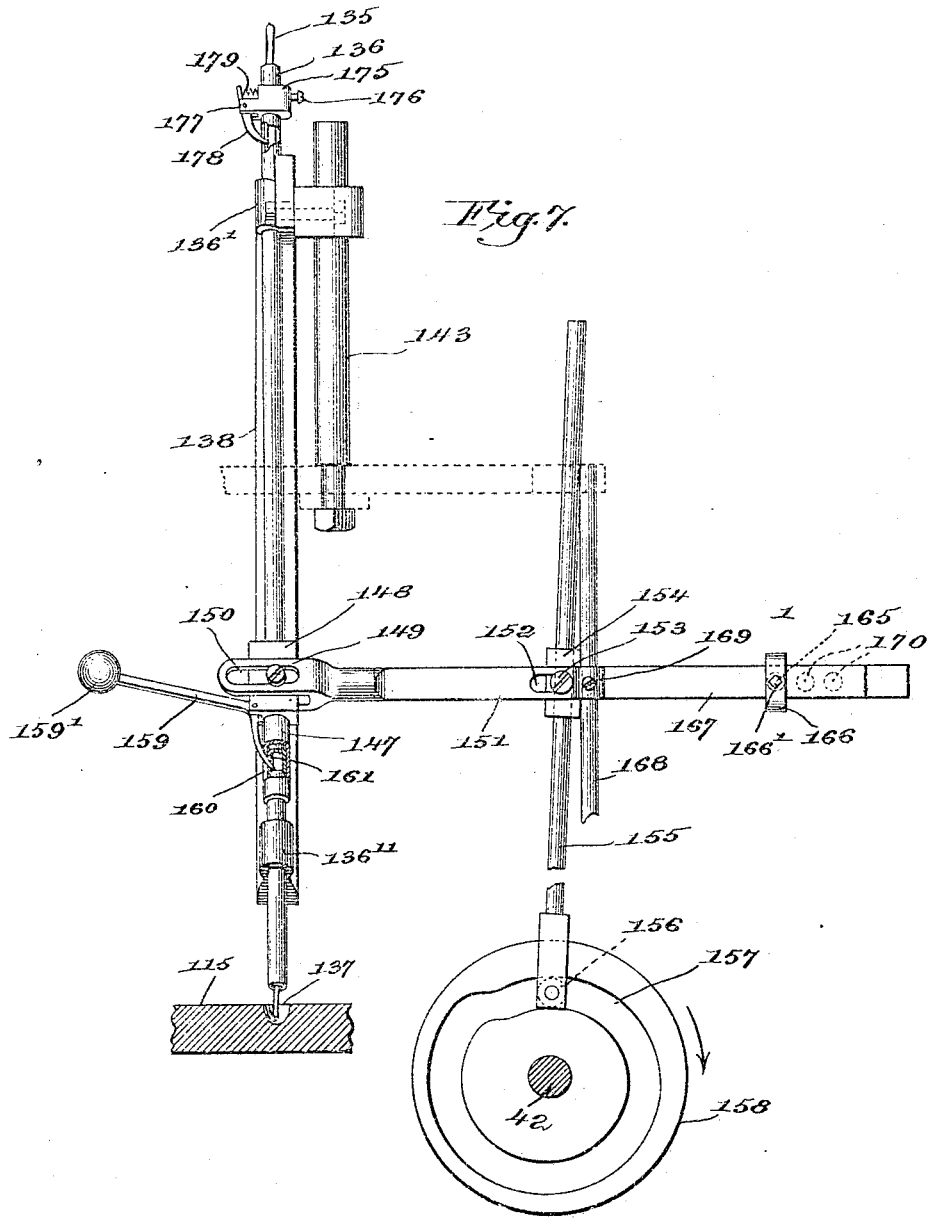

No. 766,162. Patented August 2, 1904.

UNITED STATES PATENT OFFICE.

JAMES A. BOOTH, OF EVERETT, MASSACHUSETTS, ASSIGNOR TO BOOTH SOLDERING MACHINE COMPANY, OF BOSTON, MASSACHUSETTS, A CORPORATION OF MAINE.

CAN-SOLDERING MACHINE.

SPECIFICATION forming part of Letters Patent No. 766,162, dated August 2, 1904.

Application filed May 24, 1900. Renewed January 7, 1904. Serial No. 188,138. (No model.)

*To all whom it may concern:*

Be it known that I, JAMES A. BOOTH, a citizen of the United States, residing at Everett, county of Middlesex, State of Massachusetts, have invented an Improvement in Can-Soldering Machines, of which the following description, in connection with the accompanying drawings, is a specification, like characters on the drawings representing like parts.

This invention relates to can-soldering machines; and it comprises mechanism for feeding cans successively to a primary revolving can-holder, means for applying to said cans when clamped in the primary can-holder a suitable flux, means for feeding the cans from said can-holder to a secondary can-holder, and means for applying solder to the cans while clamped in the secondary can-holder, as hereinafter described in the claims.

The improved machine is represented in one convenient embodiment thereof in the accompanying drawings, and it includes certain peculiar features hereinafter more particularly described and claimed.

Figure 4:
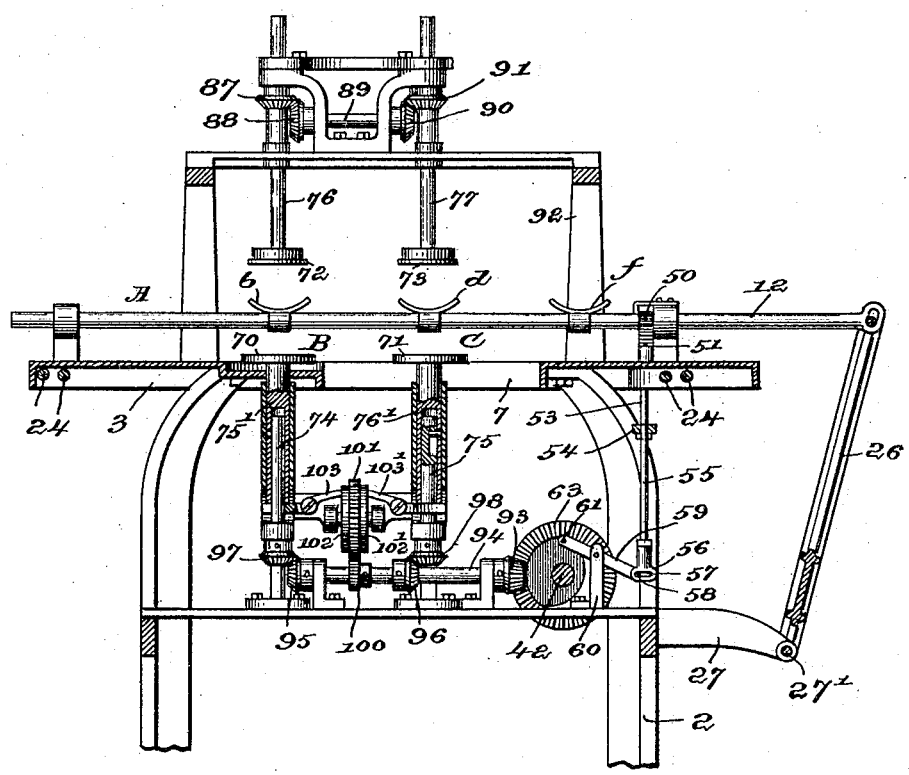
Figure 5:
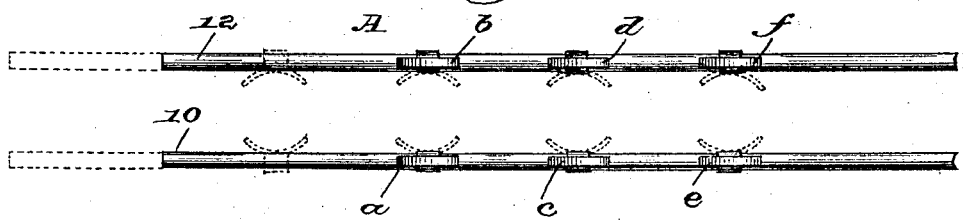

In the drawings, Figure 1 is a side elevation of a can-soldering machine involving my present improvements, portions of the framework being shown in dotted lines and representing the top stove in place for top-soldering. Fig. 2 is a sectional rear elevation of said machine, the section being in the line 2 2, Fig. 3, and some of the parts being removed. Fig. 3 is a plan view of the same, a portion of the top stove being broken away. Fig. 4 is a vertical central section of the device shown in Fig. 2. Fig. 5 is a plan view of the can-feeding means. Fig. 6 is a transverse sectional elevation looking toward the front of the machine, showing the bottom stove in place for bottom-soldering. Fig. 7 is an enlarged inside elevation, with parts broken away, of a solder-supply mechanism and means for actuating the same. Fig. 8 is a similar view of a portion of a can-feeding means and an actuating mechanism therefor. Fig. 9 is a like view of another portion of the feeding device, showing a means to throw a can-pushing member into its ineffective position. Fig. 10 is a sectional detail in the line 8 8, Fig. 9, looking toward the left. Figs. 11 and 12 are detail views of the top and bottom acid-applying devices. Figs. 13 and 14 are detail views of portions of the stoves at the places where the solder is melted, and Fig. 15 is a detail of the feed mechanism.

The framework for supporting the different parts of the machine may be of any suitable character. It is represented as consisting of two end pieces or uprights of substantially similar construction (denoted by 2) surmounted by a feed-table or bed 3, along the upper side of which the cans are fed by suitable can-feeding means. As they pass along said feed-table they are first furnished with a suitable flux, as acid, and afterward with solder, they being intermittently stopped for these two operations, and can-feeding mechanism of a peculiar nature is employed to advance the cans for treatment.

The uprights 2 sustain the main shaft of the machine. That represented is denoted by 4, and it is rotative in suitable boxes or bearings, as 5, secured to said uprights.

The main shaft 4 is operatively connected with certain of the parts to be actuated in suitable manner and is provided with a driver of some type by which it can be rotated. The driver consists of a pulley 6, and it is connected by belting (not shown) with a suitable motor.

The upper side of the feed-table 3 has a large slot or opening 7, in which certain of the parts can operate, and the slot or opening has a branch 9, in which a primary can-holder can work.

The machine in the present instance involves primary and secondary can-holders, and they consist, preferably, of clamps.

The primary can-holder maintains the can in proper position to receive the acid, while the secondary can-holder performs a like function when the can is receiving its supply of solder.

In connection with the primary and secondary can-holders I provide can-feeding means of a simple character, said can-feeding means being reciprocatory and being adapted on the advancing stroke to push a can and being ineffective on the return or retractive stroke thereof.

The can-feeding means is denoted in a general way by A, (see Fig. 3,) and as represented it includes in its construction a pair of parallel and substantially similar rods 10 and 12, adapted to move back and forth in unison a short distance above the feed-table 3. The bar 10 has a plurality of projections, as $a$, $c$, and $e$, while the bar 12 is furnished with similar projections, as $b$, $d$, and $f$. These projections are arranged to act in pairs, the projections $a$ and $b$ coöperating, while the same applies with respect to the pairs $c$ and $d$ and $e$ $f$, and the said coöperating parts are arranged in transverse alinement. All of these projections are illustrated as being of the same construction, they consisting of segments, as 17, (see Fig. 9,) secured to sleeve-like bodies, as 18, on the rods held in place by set-screws, as 19. The bar 10 is sustained for sliding movement by adjustable brackets, as 20 and 21, (see Fig. 3,) while the companion bar 12 is similarly supported by like brackets 22 and 23.

The several brackets just mentioned are supported for adjustment laterally of the line of feed, whereby the distance between the bars 10 and 12 can be regulated to adapt the feeding means to cans of different sizes or diameters. Each bracket is sustained by a pair of parallel projections extending outwardly from the frame, each projection being denoted by 24. The brackets are mounted to slide back and forth upon said parallel projections, and they are held in adjusted position by means of set-screws, for example, each denoted by 25. (See Fig. 1.) The set-screws are sustained by the brackets or bearings and are adapted to bind against the projections 24 to hold the brackets in place. As there are two projections for sustaining each bracket, the latter of course cannot turn.

The feed-bars are represented as operatively connected with a rocker, as 26, consisting of a substantially open or skeleton frame pivotally sustained at 27' by a bracket, as 27, upon the framework. The rocker 26 is bifurcated upon its upper side, the branches 28 and 29 (see Fig. 3) having hubs, as 28' and 29', at the upper ends thereof to receive the slide-bars 30 and 31, which have at their ends suitable sockets having bearings 30' to receive for rotative movement the ends of the feed-rods 10 and 12, said feed-rods being held from longitudinal movement with reference to the slide-bars 30 and 31 by any suitable means—as, for instance, a pin 31', passing through the hub 32' on the slide-bars and extending into an annular groove 33' in the end of the feed-rods. This rocker 26 may be oscillated by means of suitable connections with the main or power shaft 4. It is shown having near its lower side coöperating ears, as 26', (see Figs. 1 and 3,) between which the rod 32 is pivoted. The pivot is denoted by 33, and it extends through a vertical elongated slot, as 34, upon the detachable head 35 upon the pivoted end of the rod. The head 35 is in screw-threaded connection with the body of the rod, so that it can be moved back and forth to properly adjust the stroke of the rocker 26. (See Fig. 8.)

The rod 32 is supported for sliding movement by a plurality of properly-spaced bearings, as 36, suitably positioned upon the frame of the machine, and it is guided in a proper path by a superposed rod, as 37, disposed in parallelism therewith and fixedly supported by said bearings.

The lower rod has connected therewith a cross-piece, as 38, having near its center a stud, as a roll 39, fitted in the heart-shaped groove 40 of the cam-wheel 41, secured to the transverse shaft 42, said cross-piece sliding upon the upper rod. The shaft 42 is supported by suitable bearings upon the framework, and it has at one end the bevel-gear 43, meshing with a similar bevel-gear 44 upon the main shaft 4.

I have indicated in Fig. 1 by an arrow the direction the feeding means A takes in advancing to deliver a can successively to the acid and solder applying devices.

I have shown in full lines in Fig. 5 the feeding means in the extreme forward position thereof, and it will be seen that the projections $a$ and $b$ and $c$ and $d$ and $e$ and $f$ are in their ineffective or raised positions or out of contact with the cans and have shown by dotted lines the four positions that the coöperating projections occupy in feeding a can.

A can is taken by the projections $a$ and $b$, which partially embrace the same, said projections being of segmental shape to attain this object, and is pushed along the feed-table to the primary can-holder. Afterward the projections $a$ and $b$ are operated in such manner as to move them out of contact with the can, and the feeding means is given a return movement, and during this movement the projections will not engage the can, and this action is subsequently repeated by the succeeding projections. This return movement, however, will bring the projections $c$ and $d$ into position to take the can that is upon the primary can-holder and to advance the same to the secondary can-holder. On the backward movement of the feeding means the projections $e$ and $f$ are brought into position to engage the can upon the secondary can-holder, and when said feeding means is moved forward the soldered can will be fed from the secondary can-holder onto the feed-table. The can-holders that maintain the cans in position while having acid and solder respectively applied thereto are represented as two-part can-holders, the two parts thereof comprising clamping members between which the can is clamped, as hereinafter described. Each can-holder is composed of two plates adapted to engage the opposite ends of the can, and the can-feeding means place the cans upon the lower plates, and when they are positioned thereon the segmental projections are moved a distance equaling a quarter-turn of the feed-bars, which carry the same out of contact with the can, so that they will not interfere with the can upon the return movement of the feeding means. When, however, the feeding means has resumed the primary position thereof, the several projections will be turned to bring them into working position to feed a can or cans.

Any convenient means may be employed for moving the coöperating projections or can-pushers alternately into and out of their operative positions. They are shown in Figs. 1 and 3 by full lines as occupying their ineffective positions, it being understood, of course, that the feed-bars 10 and 12 are at the extreme ends of their forward movement. The feed-rods 10 and 12 are shown as having near the delivery side of the machine segments, as 50, in transverse alinement, the segments being longitudinally splined to the respective feed-bars and meshing with racks, as 51. The racks are vertically disposed, and their horizontal shanks 52 are shown supported by posts, as 53, rigidly secured at or near their lower ends to the horizontal cross-piece 54, from which the stem 55 depends. The stem is bifurcated at its lower end, as at 56, (see Fig. 9,) and the branches have elongated slots, as 57, to receive studs, as 58, extending oppositely from the lever 59, fulcrumed upon the standard 60. The lever 59 has at its free end a stud (shown as a roll 61) adapted to be engaged by a cam, as 62, upon the bevel-gear 63, the cam being represented as substantially crescent-shaped, said bevel-gear 63 being fixed to the transverse shaft 42. The shanks 52 are adjustably supported by bearing-sleeves, as 64, upon the upper ends of the posts 53, said shanks being held adjusted by set-screws, as 65.

It will be remembered that the bars 10 and 12 are laterally adjustable, and hence it will be understood that when they are moved either inward or outward the shanks 52 will be correspondingly moved, so as to maintain the racks 51 in mesh with the sectors 50. When adjusted, the set-screws 65 are tightened. To hold the sectors in mesh with the racks as the feed-bars 10 and 12 reciprocate, I provide stops (shown as L-shaped pieces 66) the horizontal portions of which can be suitably secured to the brackets 21 and 23, that slidingly support said feed-bars, the vertical portions of said stops (see Fig. 9) overhanging the sectors to hold them against movement with the feed-bars as the latter are reciprocated.

In Fig. 9 I have shown one of the can-engaging projections upon the bar 12 in its ineffective position, it having been moved there by the mechanism just described. The arrow in said figure shows the direction of movement of the bevel-gear 63. When the cam portion 62 upon said gear engages the projection 61, it will pull the left-hand arm of the lever 59 down and thrust the stem 55, and consequently the posts 53 and racks 51, upward, so as to turn the feed-bars 10 and 12 in such manner as to bring the can-engaging projections into their working position to embrace a can upon the feed-table or upon one of the can-holders, substantially midway between its ends. Just as the cans are placed upon the can-holders the feed-bars are turned to move the can-engaging projections upward or into their ineffective positions, in which position they remain until the rear stroke is completed, at which time they are moved down again into effective position, so that on the forward movement of the feeding means the cans may be simultaneously advanced.

The can-holders are denoted, respectively, by B and C, the can-holder B securing the can while acid is being applied thereto, while the can-holder C performs a like function during the application of the solder, and each of said can-holders is shown as consisting of a pair of parallel horizontal disks or plates adapted to be rotated, and in the present instance continuously. The lower disk or plate in each case is movable toward and from its companion, it being movable downward to receive or release a can and upward so that with the aid of its mate the can will be held in position for treatment. Therefore it will be understood that the can-holders are in the nature of clamping devices. The lower plates in each case are designated, respectively, by 70 and 71, while the upper ones are denoted by 72 and 73, the respective shafts being designated by 74, 75, 76, and 77, respectively, all of said shafts being vertically disposed and supported by suitable bearings upon the framing of the machine. The main shaft 4 is shown as provided with a bevel-gear 80, meshing with a similar bevel-gear 81 upon a vertical shaft 82, provided at its upper end with a bevel-gear 83, meshing with a similar bevel-gear 84 upon a horizontal shaft 85. (See Fig. 1.) The shaft 85 carries at its opposite end a bevel-gear 86, meshing with a bevel-gear 87 upon the shaft 76, whereby said shaft 76 can be rotated continuously from the motor-shaft. The bevel-gear 87 meshes with a bevel-gear 88 upon a horizontal shaft 89, having at its opposite end a bevel-gear 90, meshing with a bevel-gear 91 upon the shaft or spindle 77.

The several shafts just alluded to are supported in suitable manner upon an auxiliary frame 92, mounted upon the bed or table 3.

The bevel-gear 63, to which allusion has previously been made, meshes with a bevel-gear 93 upon the shaft 94, said shaft having near its opposite end the separated bevel-gears 95 and 96, meshing with the coöperating bevel-gears 97 and 98 upon the lower shafts or spindles 74 and 75, respectively, of the can-holders.

Just before the cans approach the holders the lower plates 70 and 71 thereof will be slightly below the upper side of the feed-table, and the cans continuing will be forced onto said lower plates, and when in proper position thereon the latter will be moved toward their companions to grip the can.

When the cans are positioned upon the lower plates, the can-pushing projections upon the feed-bars 10 and 12 are being moved out of contact with the can-bodies, and said feed-bars are afterward moved rearward, and when at the end of the rear stroke the can-pushing projections mentioned are moved down into working position.

The plates 70 and 71 are slidingly mounted upon their shaft-spindles 74 and 75, said plates having formed rigid therewith the depending sleeves 75' and 76'.

The shaft 94 is provided at a point substantially midway between the bevel-gears 95 and 96 with a pinion 100, meshing with a gear 101, having cam-grooves, as 102 and 102', in its opposite faces to receive the rocking levers 103 and 103'. Said levers are bifurcated at the opposite ends to straddle the sleeves 75' and 76'. This mechanism constitutes a convenient one for moving the plates 70 and 71 up and down upon their spindles to grip or release the cans.

The can has applied to it a sufficient amount of acid to enable the solder to properly adhere thereto and enter the joint or space to be filled, and the acid is applied while the can is being rotated and held by the primary holder B.

My machine is constructed to be used both for top and bottom soldering, and in Figs. 1 and 2 I have illustrated the machine as arranged for top-soldering. The arrangement for bottom-soldering will be hereinafter described.

The auxiliary frame 92 detachably supports an acid-tank, as 105, communicating by a tube 106 of reduced size with a vertically-disposed cylinder 107, which contains a wick, as 108, adapted to project through the bottom thereof and which contacts with the upper side of the can, so as to apply a line of acid thereto while the can is being rotated. The reservoir or cylinder 107 is provided with an offset 109, having a boss 110 slidable upon the vertical rod 110', depending from the horizontal portion of the auxiliary frame 92. In this way the cylinder 107 can be adjusted as to height, and when in proper position it may be held by a set-screw 110'', carried by the boss 110 and adapted to engage the vertical rod 110'. The cylinder 107 is provided with a suitable wick-feed device, as 107', serving its usual function. The wick 108 being in contact with the upper side of the can and the latter being rotated, a line of acid will be applied to said can. When this operation is concluded, the can is moved to the secondary can-holder in the manner previously set forth.

As stated above, my machine is adapted to do both top and bottom soldering, and for this purpose I have provided my machine with two stoves, one positioned to be used in top-soldering and the other positioned to be used in bottom-soldering, the said stoves being similar in the main features of their construction, but being different in that the bottom stove is a two-part stove, the two parts being adapted to be separated sufficiently to allow a can to be fed to the can-holder. The particular construction of the bottom stove will be hereinafter described.

Referring now to Figs. 1, 2, and 3, I will describe the soldering mechanism employed in connection with the top stove for melting the solder to be applied to the upper side of the can. The said top stove is denoted in a general way by D, and it comprises the rigid unitary top plate 115, having a central aperture in which the plate or disk 73 of the can-holder rotates. The said top plate 115 is supported upon the body of the stove, (denoted by 117,) the said body having the central webs or flanges 118 and the side webs or flanges 119, which unite the body of the stove to the cap-piece, the said side flanges 119 and center flanges 118 forming between them a chamber in which burners 120 are located, as will be presently described. The body portion 117 of the top stove may be supported in any suitable way on the frame of the machine, and the top stove as an entirety is fixed in position. As stated next above, the spaces between the flanges 118 and 119 of the body and the fixed cap-plate 115 constitute chambers and burners, as 120, into the same, as seen in Figs. 1 and 2. The burners may be connected by pipes, as 121, with gas-supply pipes, as 122, and with air-pipes, as 123, connected with suitable sources of air and gas supply, the air being usually admitted under pressure, so as to insure a high degree of heat. The flames from the burners 120 will heat the cap-piece 115 of the stove D to such an extent as to properly melt the solder coming against the same, and the melted solder flows onto the rotating can held between the plates 71 and 73. When the cans have been soldered, they are fed onto the feed-table, from which they are removed by hand or otherwise.

To secure a proper circulation of air to and from the burner-chambers, the top piece of the stove is provided at opposite sides thereof with irregular channels or passages, as 130, opening into the atmosphere, as shown in Fig. 3.

The solder in the present case is supplied in the form of a wire, as 135, from a spool or drum, (not shown,) and it passes through a longitudinal feed-tube, as 136, the lower free end of the solder or wire being situated in the concavity 137, which leads into the opening 116, so that the solder can be melted in the concavity 137 and flow from thence onto the top of the can and can supply a line of the solder to said can as the same is rotated. The wire solder is delivered step by step by suitable mechanism, one suitable kind of which will now be described. The solder-tube 136 is supported by suitable offsets, as 136′ and 136″, at the ends of the bar or carrier 138. The upper offset 136′ is provided near the body of the bar 138 with a bolt 140, extending through the longitudinal slot 141 in the plate 142, the hub of which embraces and slides upon the vertical bar or guide 143. A second bolt 144 extends through the slot 141 and also through a segmental slot 145, formed in the outer end of the offset 136′. By loosening the nuts of the bolts the angular position of the body 138 can be changed, and when properly adjusted the two nuts can be tightened up, this being for the purpose of changing the position of the solder-tube with respect to the can. The hub of the plate 142 carries a set-screw 146. It will be remembered that said plate to which the solder-tube 136 is connected has a sliding movement upon the vertical bar 143.

In Fig. 2 the parts are shown arranged for top soldering. To do bottom-soldering, the set-screw 146 will be loosened, so that the parts can be dropped, and when the tube is in proper position the set-screw will be tightened.

The tube 136 receives for sliding movement the sleeve 147, having the block 148 at the upper end thereof constituting a part of the solder-feeding mechanism. The block has oppositely-disposed offsets, as 149, playing in longitudinal slots 150 at what is shown as the left-hand end of the lever 151, longitudinally slotted, as at 152, to receive the stud 153 upon the block 154, carried by the connecting-rod 155, the connecting-rod having at its lower end a stud or roller, as 156, working in the cam-groove 157 of the cam 158, carried by the transverse shaft 42. (See Fig. 7.)

The block 148 sustains a solder-feed device, (shown as a counterweighted angle-lever 159 pivoted thereto,) the pointed end of the lower arm of which extends through a slot 160 in the sleeve 147 and also through a very much longer slot 161 in the tube 136. The weight 159′ at the end of the lever holds the working end thereof in firm engagement with the wire-solder 136. The parts are shown as occupying their primary position in Fig. 5. Upon the rotation of the cam 158 in the direction indicated by the arrow in said figure the block 148 will be elevated, thereby lifting the solder-feed device 159 and causing the working end of the same to ride idly over the wire-solder. Upon the descent of the block 148, however, the weight 159′ will cause the lever or working end thereof to bind against the wire in such manner as to expel from the tube 136 a quantity sufficient to solder a can. The lever 151 receives the fulcrum or pivot 165, extending laterally from the slide 166, upon the slideway or offset 167, mounted for vertical sliding movement upon the upright 168, the offset or slideway 167 being conveniently held in an adjusted position by the set-screw 169, carried by the hub thereof and adapted to engage the upright or post 168. (See Fig. 7.) The block 166 is slidable upon the offset 167, and the fulcrum thereof is adapted to fit into any one of a series of three or more openings, as 170, formed in the present case near the right-hand end of the vibratory lever 151, so as to thereby regulate the throw of said lever, and consequently of the solder-feeding device 159, whereby the amount of solder supplied to a can can be varied, it being evident that the quantity of the latter varies in accordance with the size of the can. The slide 166 may be held in an adjusted position by the set-screw 166′ thereon engaging the offset or slideway 167. The offset 167 and the block 154 of course are moved up and down as the solder-tube is raised or lowered in the manner hereinbefore specified to adapt the machine to top or bottom soldering, a single tube and coöperating parts serving in each case. The stud-screw 153, extending through the longitudinal slot 152 in the vibratory lever 151, engages the rod 155 to hold the block in its adjusted position. The longitudinal slots 152 and 150 permit the proper relationship of the parts to be maintained throughout the several adjustments, the screws 153 and 149 being tightened against the lever when the parts are adjusted to secure them in such relation. The solder-tube 136 carries near the upper end thereof a block, as 175, vertically adjustable thereon, and it may be held in any desired position by the set-screw 176, carried thereby and adapted to bind against the tube. This block constitutes a carrier for a detent, and the function of the detent is to act on the solder wire in such manner as to prevent it rising or being moved backwardly in the solder-tube as the feeding device 159 is elevated. The block or carrier 175 has a slotted ear or lug 177, pivotally receiving a detent 178, the point or effective end of which is held in contact with the solder wire by means of a spring, as 179, connected, respectively, with the upper arm of the detent and with the block or carrier 175, the spring being sufficiently stiff as to prevent retractive movement of the solder wire as the feed device 159 is raised. The free end solder wire is normally a short distance above the bottom of the concavity 137, and when the feed device 159 is elevated it will on its opposite stroke force a length of wire into said concavity, where the wire is melted by the heat of the stove and separated from the body thereof, and the melted solder flows onto the top of the rotating can held by the secondary can-holder C.

The parts are so timed in their operation that the feed device is elevated at about the point the can is positioned for soldering.

The machine shown in Fig. 2 is arranged for top-soldering, as above stated, and in Fig. 6 the arrangement for bottom-soldering is shown, and while in each of said figures I have illustrated a single stove only, yet I wish it understood that I may in my completed machine employ both stoves at the same time, in which case the machine may be adapted for either top or bottom soldering. The bottom stove used in bottom-soldering is denoted generally by E, and it is similar in construction to the top stove, above described, the same bottom stove comprising a two-part plate, similar to plate 115 of the top stove, and burners for heating the same. As the cans are fed onto the can-holder it is necessary to move the bottom stove out of the way of the can being delivered to the can-holder, and for this purpose I have constructed my bottom stove in two sections, which are movable transversely to the line of feed of the can, and automatic mechanism is provided to separate the stove-sections to allow the can to be fed to the can-holder, and when the can has been delivered to the can-holder such automatic mechanism operates to bring the stove-sections together and in contact with the bottom of the can, it being understood, of course, that the stove-sections are shaped to fit the can. The plate of the bottom stove, which is hereinafter called the "bottom" plate, is a two-part plate, the two parts thereof being designated by 200 and 201, respectively, the said two parts of the plate being supported upon two stove-body sections, similar to stove-sections 117 of the top stove, into which stove-body sections the combined air and gas is admitted to heat two sections 200 and 201 of the bottom plate. I do not deem it necessary to show the burners nor the connections between the same and the gas and air mixing appliances for bottom stove-sections, for they are in all respects similar to the corresponding appliances used in top stove-sections and illustrated in Fig. 2. Each bottom stove-section has depending therefrom legs or standards 190, which are detachably fitted into bosses 191 upon the carriages 192 and 193, which are reciprocated alternately toward and from each other during bottom-soldering. It will be understood that each of the stoves is detachably connected with a sliding carriage. Brackets, as 202 and 203, are secured to the under sides of the traveling carriages 192 and 193 near their corners, and these brackets carry studs, such as antifriction-rolls 204 and 205, adapted to enter heart-shaped grooves, as 206 and 207, in the cams 208 and 209, the cam 208 being carried by the main or power shaft 4, while the cam 209 is carried by a shaft 210 upon the opposite side of the machine. The shaft 210 carries at one end a bevel-gear 221, meshing with a bevel-gear 212 upon the shaft 42 by which to drive said shaft 210. The cams 208 and 209 are so arranged that the sections of the stove are moved out of the path of the can just as the same is fed over the can-holder C and are moved toward each other when the can is positioned thereon and then are moved away from each other to release the can, so it can be fed forward. The brackets 202 are shown connected to the traveling carriages each by a pair of screws, as 213. When top-soldering only is being done, the bottom stove-sections of course are not being used, and therefore I prefer to disconnect the same from the cams 208 and 209, respectively, so as to prevent their reciprocating and hold them out of the way of the cans being fed to and from the can-holder. When, therefore, the bottom stove-sections are not to be used, one of the screws, as 213, is removed from each of the brackets 202, and the said brackets are swung, so as to carry the rolls 204 and 205 out of the cam-grooves 206 and 207, and the said carriages are held at rest, with the stove-sections separated by means of suitable eye-bolts 195, which pass through any fixed portion of the frame and have the eye thereof connected to or surrounding the standards 190 of the bottom stove-section.

The acid-tank 105 (see Fig. 6) has a longer tube connected to it for bottom-soldering work than for top-soldering, and such longer tube is denoted by 220, said tube having its lower end disposed in the pan 221, projecting from the substantially cylindrical body 222, the lip 223 extending oppositely from said body and receiving the wick 224, which extends through the body transversely thereof and lies in the pan 221, the wick being saturated with acid and serving to apply the same to the bottom of the can held and rotated by the primary can-holder B. I provide a feed device for the wick, as 225, it consisting of a shaft having a hand-wheel, as 226, at one end and a toothed wheel (not shown) at the other end to engage and feed the wick forward as it becomes worn. The body 222 has upon its under side an ear 227, adapted to receive the shank 228, fitted within the tube 229, projecting from the sleeve 230 at the upper end of the rod 231. The sleeve 230 is adjustable on the rod to adapt the device to applying acid to cans of different heights and is held in proper relation by a set-screw 232. The rod 231 has at its lower end a block, as 235, rigidly connected with a rod, as 236, having a stud, as 237, at its end playing in the cam-groove 238 of the cam 239. The foot or block 235 slides upon the guide 240, suitably fixed upon the top plate. The parts are so arranged that the wick-carrier is moved up into contact with the cam when the same is positioned upon the primary can-holder and is held in such position while the can is being given a full turn and is afterward moved back out of the path of said can.

The apparatus may be materially modified within the scope of the accompanying claims.

Having described my invention, what I claim, and desire to secure by Letters Patent, is—

1. In a machine of the class described, a plurality of can-holders each consisting of a clamping device, and reciprocating means for feeding a can to one can-holder and from it to another can-holder, the feeding means being operative independently of the can-holders.

2. In a machine of the class described, a plurality of can-holders each consisting of a clamping device, reciprocating devices for feeding a can to one can-holder and then from it to another can-holder, the feeding devices being operative independently of the can-holders, and means for supplying a flux and solder, respectively, to the can while held by the can-holders.

3. In a machine of the class described, a plurality of can-holders each consisting of a clamping device, and reciprocatory means for feeding a can to one can-holder and then from it to another can-holder.

4. In a machine of the class described, a plurality of rotary can-holders, a reciprocatory feeding device for feeding a can to one can-holder and then from it to another can-holder, the feeding device being operative independently of the can-holders, and means for supplying a flux and solder, respectively, to said can while it is held by the can-holders.

5. In a machine of the class described, a can-holder and a soldering device, means to rotate one of said parts relative to the other, and a reciprocatory feeding device independent of the can-holder to feed a can onto said can-holder and then off the same.

6. In a machine of the class described, a plurality of can-holders, each consisting of a clamping device, means for moving one member of each clamping device toward and from the other to successively grip and then release a can, and means to reciprocate the clamping devices to feed a can to one can-holder and then from it to another can-holder, the reciprocating means being operative independently of the can-holders.

7. In a machine of the class described, a plurality of can-holders, each consisting of a clamping device, means for moving one member of each clamping device toward and from the other to successively grip and then release a can, means for feeding a can to one can-holder and then from it to another can-holder, the feeding means being operative independently of the can-holders, and means for supplying a flux to the can while it is held by one can-holder, and means for supplying solder to said can while held by the next succeeding can-holder.

8. In a machine of the class described, a plurality of can-holders, each consisting of a clamping device, means for rotating said can-holders, means for feeding a can to one can-holder and then from it to another can-holder, the feeding means being operative independently of the can-holders, means for supplying a flux to the can while it is held by one can-holder, and means for supplying solder to said can while it is held by another can-holder, and means for moving one member of each can-holder toward and from its companion.

9. In a machine of the class described, a can-holder consisting of a clamping device, and a can-soldering member, means for rotating one of said members relative to the other, and reciprocating means to supply a can to said can-holder, said means being operative independently of said can-holder.

10. In a machine of the class described, a fixed feed-table, a plurality of can-holders, each consisting of a clamping device, one member of each clamping device being supported to receive a can from the feed-table, means for pushing the can along the feed-table and from the same onto said receiving member of each can-holder in succession, means for moving one member of each can-holder toward and from the other to successively grip and release a can, and flux and solder supplying means to act in succession upon said can.

11. In a machine of the class described, a feed device, including a reciprocatory member having a projection to engage an object, and means to move the projection into and out of its operative position independently of the feed movement of said feed device.

12. In a machine of the class described, a feed device, including a reciprocatory member having a projection to engage a can, means to move the projection into and out of its operative position independently of the feed movement of said feed device, and a can-holder to receive the can.

13. In a machine of the class described, a feed device, including a reciprocatory member having a projection to engage an object, said reciprocatory member being rotary, and means to turn said reciprocatory member when at either limit of its movement.

14. In a machine of the class described, a feed device, including a member having a projection to engage an object, and means to move the projection into and out of its operative position independently of the feed movement of said feed device.

15. In a machine of the class described, a feed device, including a plurality of members having can-engaging projections, and means to move said projections into and out of their operative position independently of the feed movement of said feed device.

16. In a machine of the class described, a feed device having a plurality of can-engaging projections, a series of can-holders adapted to receive cans in succession, means for operating said feed device, and means to move said projections into and out of their operative position independently of the feed movement of said feed device.

17. In a machine of the class described, a feed device consisting of two rotary bars provided with segmental can-engaging projections, means to actuate the feed device, and means to turn said bars independently of the feed movement of the feed device.

18. In a machine of the class described, a feed-table to support a can, a feed device, including a reciprocatory member having a projection to engage and push the can along the feed-table, and means to move the projection into and out of its operative position independently of the feed movement of said feed device.

19. In a machine of the class described, a feed device, including a reciprocatory member having a projection to engage an object, means to reciprocate the feed device, and means, including intermeshing gears, to move the projection into and out of its operative position independently of the feed movement of said feed device.

20. In a machine of the class described, a feed device consisting of a series of rotary bars, each having can-engaging projections, means to advance said bars in unison, a plurality of gears, certain of which are carried by the bars, and means for operating the other gears.

21. In a machine of the class described, a feed device consisting of a plurality of bars having projections, one of said bars being mounted for lateral adjustment, and means to move said projection into and out of its operative position independently of the feed movement of said feed device.

22. In a machine of the class described, a slotted feed-table, primary and secondary can-holders having a member working in said slot, and means for pushing a can along the feed-table and then onto the said members that work in the slot.

23. In a machine of the class described, a can-holder, means for feeding a can to said can-holder, a series of traveling carriages, a stove in a plurality of parts detachably sustained respectively by said traveling carriages, and means for operating said carriages or for positively locking the same against motion.

24. In a machine of the class described, primary and secondary can-holders, means independent of the can-holders for feeding a can first to the primary and from the latter to the secondary can-holder, and afterward away from said secondary can-holder, means to supply acid to the can while upon the primary can-holder, a stove to melt the solder, means for supplying the solder to the stove, from whence it can run to the can, and means to heat said stove.

25. In a machine of the class described, a can-holder, means for feeding a can to said can-holder, a two-part stove, traveling carriages to support the parts of the stove, drivers for the two parts of the stove, and means shiftable in inoperative position with respect to the drivers, to normally impart motion from said drivers to the carriages.

26. In a machine of the class described, a can-holder, means to supply a can to said can-holder, a stove in a plurality of parts, the stove having depending bars, traveling carriages having bosses to detachably receive said bars, and means connected with the framework to engage said bars.

27. In a machine of the class described, a can-holder, means to supply a can to said can-holder, a stove, a plurality of traveling carriages to support said stove, and means to move said carriages during bottom-soldering or for holding them against motion during top soldering.

28. In a machine of the class described, a series of two-part can-holders to successively receive the can, means to take a can from one can-holder and positively deliver it to the next succeeding can-holder, means for maintaining said can-holders at a fixed point in the line of feed of the can, whereby the can when in the holder is held against movement in the direction of the line of feed.

29. In a machine of the class described, a series of two-part can-holders, each adapted to receive a single can only, means independent from the can-holders to take a can from one can-holder and positively deliver it to the next can-holder of the series, and means for rotating said can-holders.

30. In a machine of the class described, a series of two-part can-holders, each constructed to receive a single can only, means independent of the can-holders for feeding a can to each can-holder of the series in succession, a stove, and means to present solder-wire to the stove for melting.

31. In a machine of the class described, a plurality of can-holders, each constructed to receive a single can only, means independent from the can-holders to feed a can to each can-holder of the series in succession, said can-holders each being fixed against movement in the line of feed of the can.

32. In a machine of the class described, a series of can-holders, each adapted to hold a single can only, means independent of the can-holders to present a can successively to each can-holder of the series, a stove, a tube to contain solder-wire, and means carried by the tube to engage the wire and feed the same step by step.

33. In a machine of the class described, a series of two-part can-holders, each adapted to hold a single can only, means independent of the can-holders to present a can to each can-holder of the series consecutively, a stove, a tube to contain solder-wire, means carried by the tube to engage the wire and feed the same step by step, and means to prevent back motion of the solder-wire.

34. In a machine of the class described, a series of two-part can-holders, each adapted to receive and hold a single can only, means independent of the can-holders to present a can to each can-holder of the series consecutively, a stove, a tube to contain solder-wire, means carried by the tube to engage the wire and feed the same step by step, and means to change the angular position of the solder-containing tube.

35. In a machine of the class described, a series of two-part can-holders, each adapted to receive a single can only, means independent of said can-holders to feed a can to each can-holder of the series successively, a stove, a solder-tube to coöperate with the stove, a slide upon the tube provided with a device to engage and feed the wire-solder from said tube, and means to move said slide back and forth.

36. In a machine of the class described, a series of two-part can-holders, each adapted to receive a single can only, means independent of said can-holders to feed a can to each can-holder of the series consecutively, a stove, a solder-containing tube to coöperate with the stove, a slide upon the tube provided with a device to engage and feed the wire-solder from said tube, and means to move said slide back and forth and to vary the stroke thereof.

37. In a machine of the class described, a series of can-holders, each constructed to receive a single can only, and being fixed against movement in the line of feed of the can, means to feed a can to each can-holder of the series consecutively, said feeding means being independent from the can-holder.

38. In a machine of the class described, means for feeding a can forward in a right line, a two-part rotary can-holder independent of the feeding means and fixed against movement in the direction of the line of feed, said can-holder being constructed to receive a single can only, and soldering mechanism to apply solder to the can when rotated by the can-holder.

39. In a machine of the class described, a two-part rotary can-holder adapted to hold a single can only, means independent of the can-holder to present a can thereto, a stove, a tube to contain solder-wire, and means carried by the tube to engage the wire and feed the same step by step.

40. In a machine of the class described, a two-part rotary can-holder adapted to receive and hold a single can only, means independent of the can-holder to present a can thereto, a stove, a tube to contain solder-wire, means carried by the tube to engage the wire and feed the same step by step, and means to change the angular position of the solder-containing tube.

41. In a machine of the class described, a can-holder, means to supply a can thereto, a heating device comprising a fixed top plate, means to heat the same for top-soldering, a two-part bottom plate, means to heat the same, and means to automatically separate the two parts of the bottom plate when a can is being delivered to the can-holder.

42. In a machine of the class described, a two-part rotary can-holder, means to supply a can thereto, a fixed top plate having a central aperture to receive one part of the can-holder, a two-part bottom plate having adjoining ends shaped to fit the can, means to automatically separate said two bottom plate-sections when a can is delivered to the can-holder, means to bring the two bottom plate-sections together after a can is received by the can-holder, and means to heat both said plates.

In testimony whereof I have signed my name to this specification in the presence of two subscribing witnesses.

JAMES A. BOOTH.

Witnesses:
HEATH SUTHERLAND,
LAURA T. MANIX.